(12) United States Patent
Oki et al.

(10) Patent No.: US 11,926,216 B2
(45) Date of Patent: Mar. 12, 2024

(54) VIBRATION DAMPING DEVICE AND METHOD OF MANUFACTURING THE SAME

(71) Applicants: SUMITOMO RIKO COMPANY LIMITED, Komaki (JP); HONDA MOTOR CO., LTD., Tokyo (JP)

(72) Inventors: Kenji Oki, Komaki (JP); Shingo Tanaka, Komaki (JP); Hiroki Kondo, Komaki (JP); Yusuke Arai, Tokyo (JP); Kozo Kubota, Tokyo (JP)

(73) Assignees: SUMITOMO RIKO COMPANY LIMITED, Komaki (JP); HONDA MOTOR CO., LTD., Tokyo (JP)

( * ) Notice: Subject to any disclaimer, the term of this patent is extended or adjusted under 35 U.S.C. 154(b) by 145 days.

(21) Appl. No.: 17/560,777

(22) Filed: Dec. 23, 2021

(65) Prior Publication Data
US 2022/0297525 A1    Sep. 22, 2022

(30) Foreign Application Priority Data

Mar. 22, 2021  (JP) ................................ 2021-047685

(51) Int. Cl.
*B60K 5/12*        (2006.01)
*F16F 13/00*       (2006.01)
(Continued)

(52) U.S. Cl.
CPC ............ *B60K 5/1208* (2013.01); *F16F 15/08* (2013.01); *F16F 2230/0005* (2013.01)

(58) Field of Classification Search
CPC ......... B60K 5/1208; B60K 5/12; F16F 15/08; F16F 2230/0005; F16F 13/10; F16F 13/103; F16F 13/00; F16F 2226/04; G01M 13/00
See application file for complete search history.

(56) References Cited

U.S. PATENT DOCUMENTS 8,403,097 B2 * 3/2013 Joly ....................... F16F 1/373
267/140.13
9,562,587 B2 * 2/2017 Pichel .................. F16F 1/3863
(Continued)

FOREIGN PATENT DOCUMENTS

JP          2018-162824 A       10/2018

*Primary Examiner* — Robert A. Siconolfi
*Assistant Examiner* — James K Hsiao
(74) *Attorney, Agent, or Firm* — Oliff PLC

(57) ABSTRACT

A vibration damping device including a vibration-damping device main unit inserted into a mounting space of a bracket from a lateral side and securely supported by the bracket. The bracket includes engaging pieces on respective opposed inside faces of the mounting space, and engaging action of the engaging pieces with respect to respective detent engaging faces formed on a fixture member of the vibration-damping device main unit prevents the vibration-damping device main unit from becoming dislodged from the mounting space of the bracket. Opposed walls of the mounting space are each penetrated by an aperture window, and inspection flat surfaces are separately provided to an outside surface of each engaging piece visible from an outside through the aperture window and a corresponding external side surface of the bracket that is off the aperture window. The inspection flat surfaces are parallel to each other.

5 Claims, 13 Drawing Sheets

(51) Int. Cl.
*F16F 13/10* (2006.01)
*F16F 15/08* (2006.01)

(56) References Cited

U.S. PATENT DOCUMENTS

| | | | | |
|---|---|---|---|---|
| 9,593,732 | B2* | 3/2017 | Thierry | F16F 13/103 |
| 9,739,333 | B2* | 8/2017 | Michiyama | B60K 5/1208 |
| 10,906,384 | B2* | 2/2021 | Kadowaki | F16F 1/3849 |
| 11,454,295 | B2* | 9/2022 | Kondo | B60K 5/12 |
| 11,585,425 | B2* | 2/2023 | Lee | F16H 57/025 |
| 11,592,077 | B2* | 2/2023 | Tanaka | F16F 13/085 |
| 2004/0021259 | A1* | 2/2004 | Visage | F16F 13/108 |
| | | | | 267/140.13 |
| 2007/0172167 | A1* | 7/2007 | Lew | B60K 17/24 |
| | | | | 384/536 |
| 2010/0264570 | A1* | 10/2010 | Thierry | F16F 15/08 |
| | | | | 267/141 |
| 2011/0219735 | A1* | 9/2011 | Li | F02M 35/024 |
| | | | | 55/480 |
| 2015/0252866 | A1* | 9/2015 | Muraoka | F16F 13/085 |
| | | | | 267/140.13 |
| 2016/0238102 | A1* | 8/2016 | Goto | F16F 13/103 |
| 2017/0122398 | A1* | 5/2017 | Michiyama | F16F 1/36 |
| 2017/0341500 | A1* | 11/2017 | Oki | F16F 13/103 |
| 2018/0135724 | A1* | 5/2018 | Ikawa | F16F 13/106 |
| 2020/0217391 | A1* | 7/2020 | Kadowaki | B60K 5/1208 |

* cited by examiner

VIBRATION DAMPING DEVICE AND METHOD OF MANUFACTURING THE SAME

INCORPORATED BY REFERENCE

The disclosure of Japanese Patent Application No. 2021-047685 filed on Mar. 22, 2021 including the specification, drawings and abstract is incorporated herein by reference in its entirety.

BACKGROUND OF THE INVENTION

1. Field of the Invention

The present invention relates to a vibration damping device for use in, for example, an automotive engine mount or the like, and a method of manufacturing the same.

2. Description of the Related Art

Conventionally, for example, a vibration damping device having a structure in which a bracket is attached to the vibration-damping device main unit is used, for example, in an engine mount for an automobile. As shown in Japanese Unexamined Patent Publication No. JP-A-2018-162824, the bracket has a mounting space into which the vibration-damping device main unit is inserted from the lateral side, and the vibration damping device has a structure in which a fixing member of the vibration-damping device main unit is arranged between the opposed inside faces of the mounting space of the bracket and securely supported by the bracket.

Meanwhile, in JP-A-2018-162824, in order to prevent the vibration-damping device main unit from becoming dislodged from the mounting space of the bracket, there is provided a detent structure by engagement between engaging parts provided to the fixing member of the vibration-damping device main unit and engaging parts provided to opposed inside faces of the bracket.

SUMMARY OF THE INVENTION

However, as in JP-A-2018-162824, if the detent structure for preventing the vibration-damping device main unit from becoming dislodged from the bracket is provided in the mounting space of the bracket, for example, when the vibration-damping device main unit is inserted and attached to the mounting space of the bracket, it is difficult to accurately grasp engagement failure in which the engaging parts are not engaged in an appropriate state. In JP-A-2018-162824, disclosed is a structure in which a through hole is provided in the forward wall, which is located on the forward side of the bracket in the direction of insertion of the vibration-damping device main unit, and the engaging parts can be visually confirmed through the through hole. However, with the through hole provided in the forward wall of the bracket, the engaging face is hidden by the claw-shaped engaging part, making it difficult to confirm the engaged state. Thus, visually confirming the dark and narrow engaged portion inside the through hole per se is difficult. For example, it is substantially impossible to find a defect such as a crack generated on a surface other than the visible surface.

It is therefore one object of the present invention to provide a vibration damping device of novel structure which is able to easily and accurately confirm that the vibration-damping device main unit is appropriately prevented from becoming dislodged from the bracket.

Moreover, it is another object of the present invention to provide a method of manufacturing the vibration damping device as described above.

Hereinafter, preferred embodiments for grasping the present invention will be described. However, each preferred embodiment described below is exemplary and can be appropriately combined with each other. Besides, a plurality of elements described in each preferred embodiment can be recognized and adopted as independently as possible, or can also be appropriately combined with any element described in other preferred embodiments. By so doing, in the present invention, various other preferred embodiments can be realized without being limited to those described below.

A first preferred embodiment provides a vibration damping device comprising: a vibration-damping device main unit including a fixture member; and a bracket having a mounting space, the vibration-damping device main unit being inserted into the mounting space of the bracket from a lateral side such that the fixture member of the vibration-damping device main unit is arranged between opposed inside faces of the mounting space and securely supported by the bracket, wherein the bracket includes engaging pieces on the respective opposed inside faces of the mounting space while the vibration-damping device main unit includes detent engaging faces formed on the fixture member, and engaging action of the engaging pieces with respect to the respective detent engaging faces prevents the vibration-damping device main unit from becoming dislodged from the mounting space of the bracket, and opposed walls of the mounting space of the bracket are each penetrated by an aperture window, and inspection flat surfaces are separately provided to an outside surface of each engaging piece visible from an outside through the aperture window and a corresponding external side surface of the bracket that is off the aperture window, the inspection flat surfaces being parallel to each other.

According to the vibration damping device structured following the present preferred embodiment, by measuring the relative positions of the inspection flat surfaces provided to the outside surface of the engaging piece and the external side surface of the bracket, it is possible, for example, to easily and accurately confirm the engagement failure between the engaging piece and the detent engaging face due to damage to the engaging piece or the like. In particular, since the inspection flat surfaces are parallel to each other, the relative positions of the inspection flat surfaces can also be stably measured by a machine with high accuracy.

A second preferred embodiment provides the vibration damping device according to the first preferred embodiment, wherein a gap is provided between overlapped surfaces of an inside surface of each engaging piece and the fixture member.

According to the vibration damping device structured following the present preferred embodiment, the engaging piece is prevented from being engaged with the detent engaging face in a deformed state in contact with the fixture member, thereby stably realizing an appropriate engaged state between the engaging piece and the detent engaging face.

A third preferred embodiment provides the vibration damping device according to the first or second preferred embodiment, wherein the inspection flat surface provided to the external side surface of the bracket is provided adjacently to the aperture window in a direction of parting a mold for molding the external side surface of the bracket.

According to the vibration damping device structured following the present preferred embodiment, for example, the external side surface of the bracket can be molded by a simple mold structure parted in a direction orthogonal to the direction of opening of the aperture window. Additionally, it is easy to form the inspection flat surface parallel to the direction of parting the mold on the external side surface of the bracket that is off the aperture window.

A fourth preferred embodiment provides a method of manufacturing the vibration damping device according to any one of the first through third preferred embodiments, comprising a non-destructive inspection step of measuring relative positions of the inspection flat surface provided to the outside surface of each engaging piece and the inspection flat surface provided to the corresponding external side surface of the bracket such that engagement failure between the engaging piece and the corresponding detent engaging face is detected.

According to the method of manufacturing the vibration damping device following the present preferred embodiment, engagement failure between the engaging piece and the detent engaging face due to, for example, damage to the engaging piece or the like, can be confirmed easily and accurately based on the relative positions of the inspection flat surfaces. Since the inspection flat surfaces are provided so as to be exposed to the outside and are parallel to each other, the relative positions can be easily measured by a machine, thereby reducing the labor and the time required for inspection.

A fifth preferred embodiment provides the method of manufacturing the vibration damping device according to the fourth preferred embodiment, wherein the relative positions of the inspection flat surfaces are measured in a direction orthogonal to the inspection flat surfaces.

According to the method of manufacturing the vibration damping device following the present preferred embodiment, the direction of measuring the relative positions of the inspection flat surfaces coincides with the direction orthogonal to the inspection flat surfaces. Thus, for example, even if an error occurs in the measurement position of the inspection flat surface, the influence on the measurement results is suppressed, thereby stably measuring the relative positions.

According to the present invention, it is possible to easily and accurately confirm that the vibration-damping device main unit is appropriately prevented from becoming dislodged from the bracket.

BRIEF DESCRIPTION OF THE DRAWINGS

The foregoing and/or other objects, features and advantages of the invention will become more apparent from the following description of a practical embodiment with reference to the accompanying drawings in which like reference numerals designate like elements and wherein.

DETAILED DESCRIPTION OF EMBODIMENTS

Figure 1:
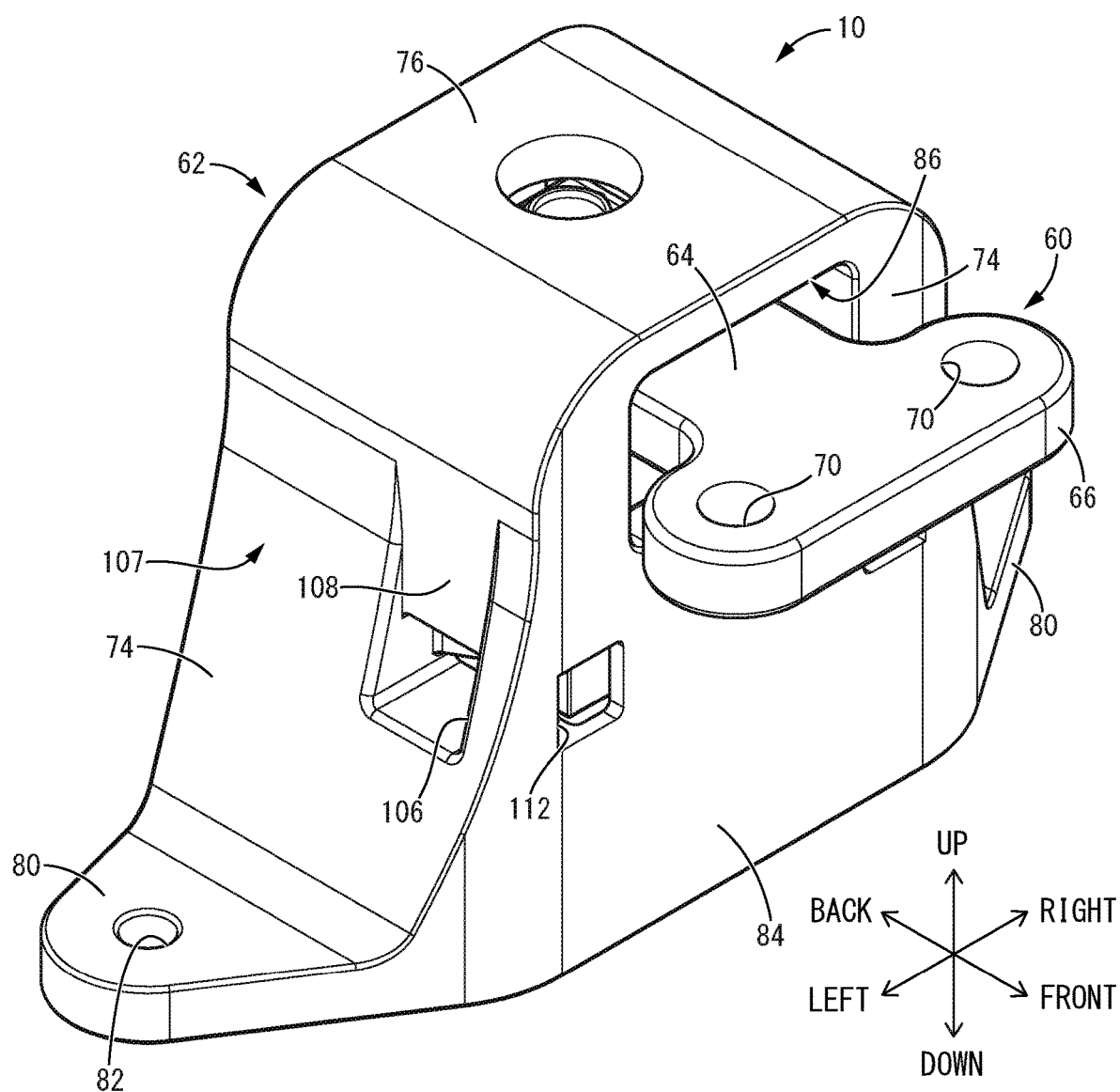
FIG. 1 is a perspective view showing a vibration damping device in the form of an engine mount according to a first practical embodiment of the present invention.
Figure 2:
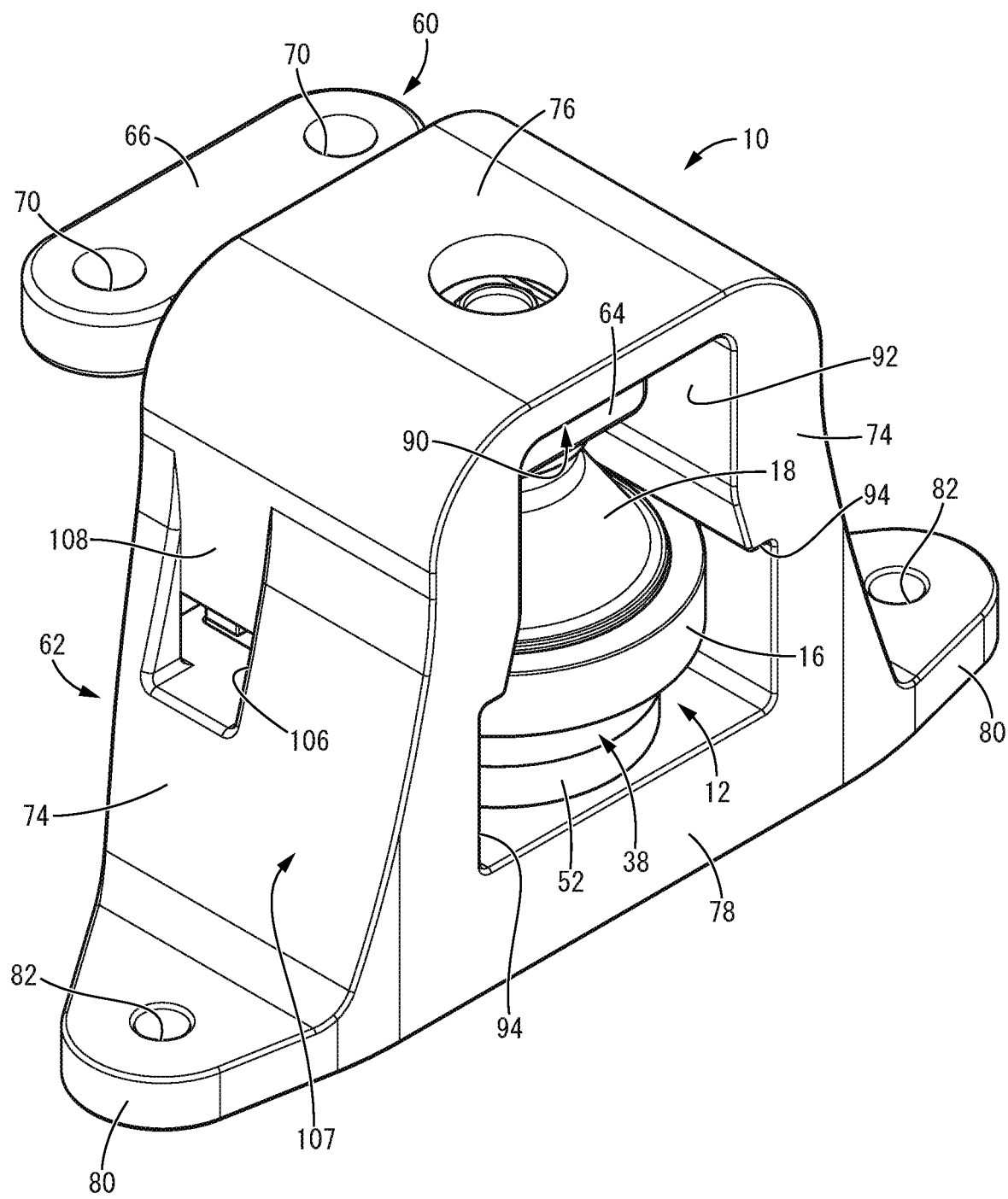
FIG. 2 is a perspective view of the engine mount shown in FIG. 1 at another angle.

A practical embodiment of the present invention will be described below in reference to the drawings.

Referring first to FIGS. 1 to 6, there is depicted an automotive engine mount 10 as a first practical embodiment of a vibration damping device according to the present invention. The engine mount 10 includes a mount main unit 12 serving as a vibration-damping device main unit. As shown in FIG. 7, the mount main unit 12 has a structure in which a first mounting member 14 and a second mounting member 16 serving as a fixture member are connected by a main rubber elastic body 18. In the following description, as a general rule, the vertical direction refers to the vertical direction in FIG. 4, which coincides with the mount center axis direction, and the left-right direction refers to the left-right direction in FIG. 4, which coincides with the width direction of an outer bracket 62 to be described later. Besides, as a general rule, the front-back direction refers to the left-right direction in FIG. 5, the front (forward) refers to rightward in FIG. 5, and the back (backward) refers to leftward in FIG. 5. In addition, for a plurality of identical members, reference numerals may be assigned to only a part of the members, and may be omitted from others.

Figure 4:
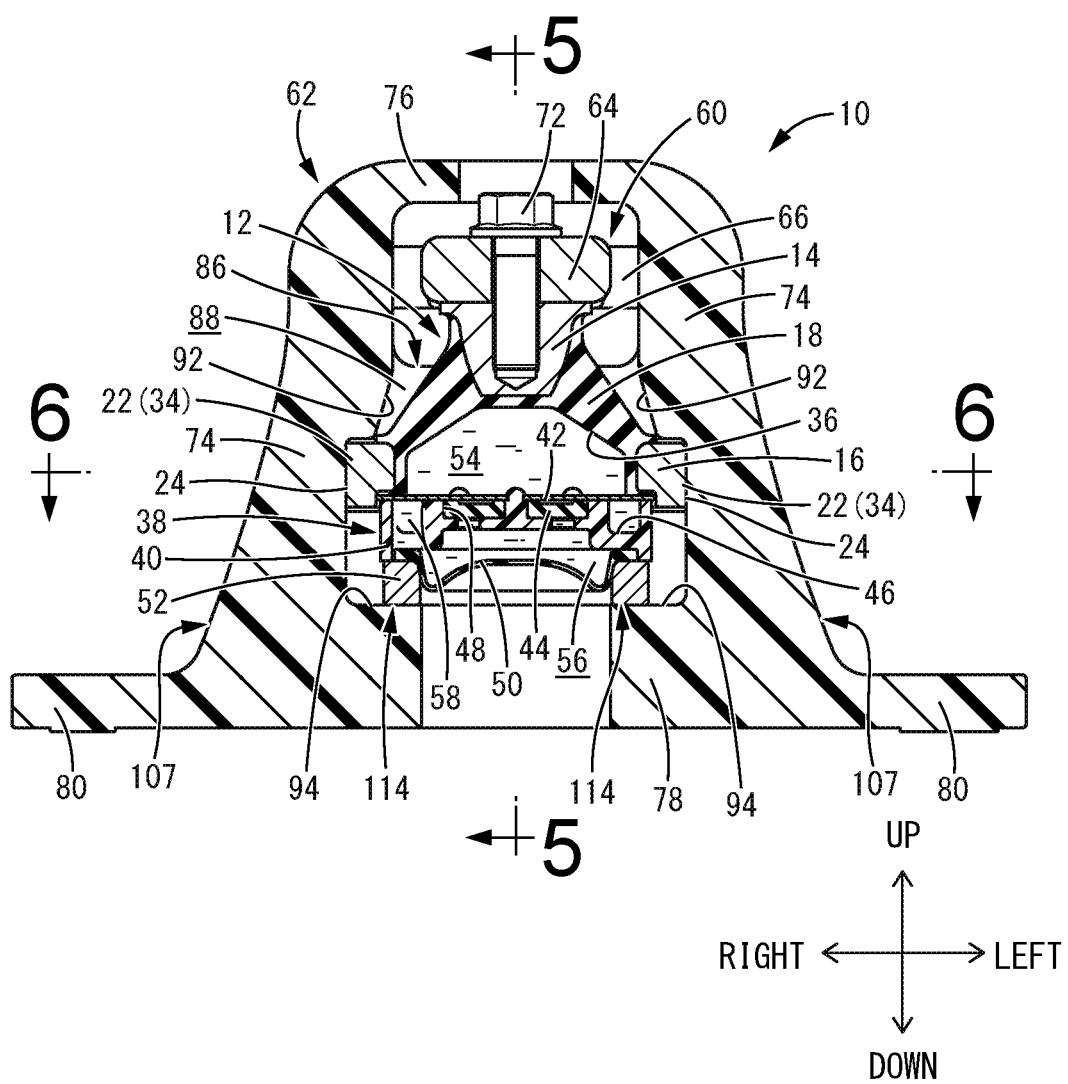
FIG. 4 is a vertical cross-sectional view of the engine mount shown in FIG. 1, which is equivalent to a cross-sectional view taken along line 4-4 of FIG. 5.
Figure 5:
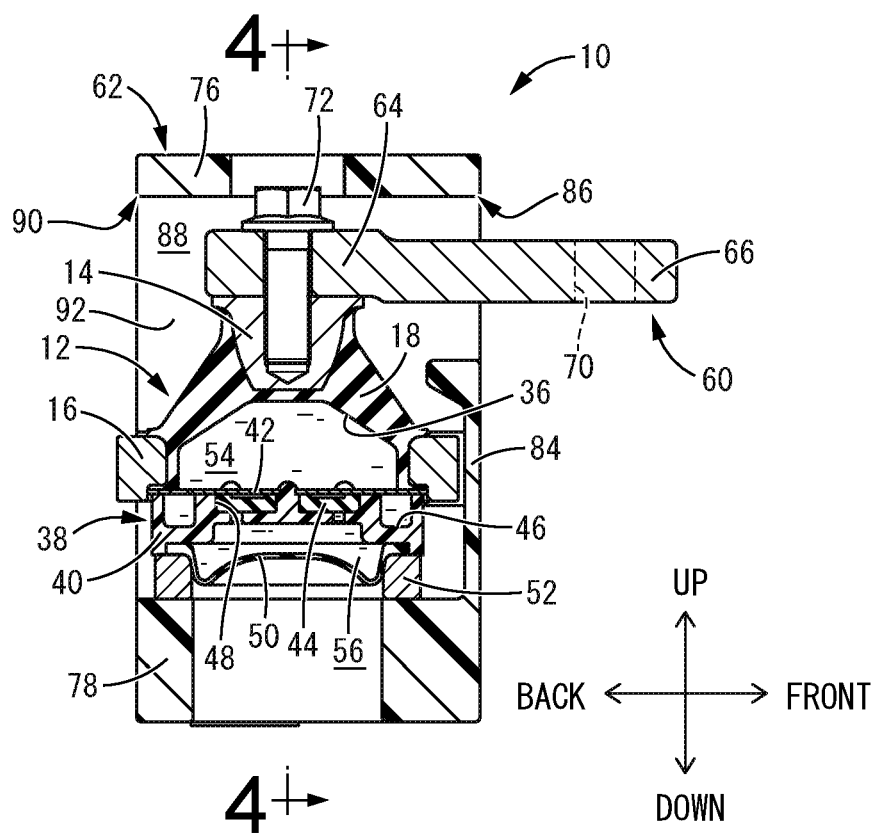
FIG. 5 is a cross-sectional view taken along line 5-5 of FIG. 4.

The first mounting member 14 is a high rigidity component formed of metal, synthetic resin, or the like, and is a solid, round block shape as shown in FIGS. 4 and 5. The first mounting member 14 decreases in diameter toward the bottom.

Figure 6:
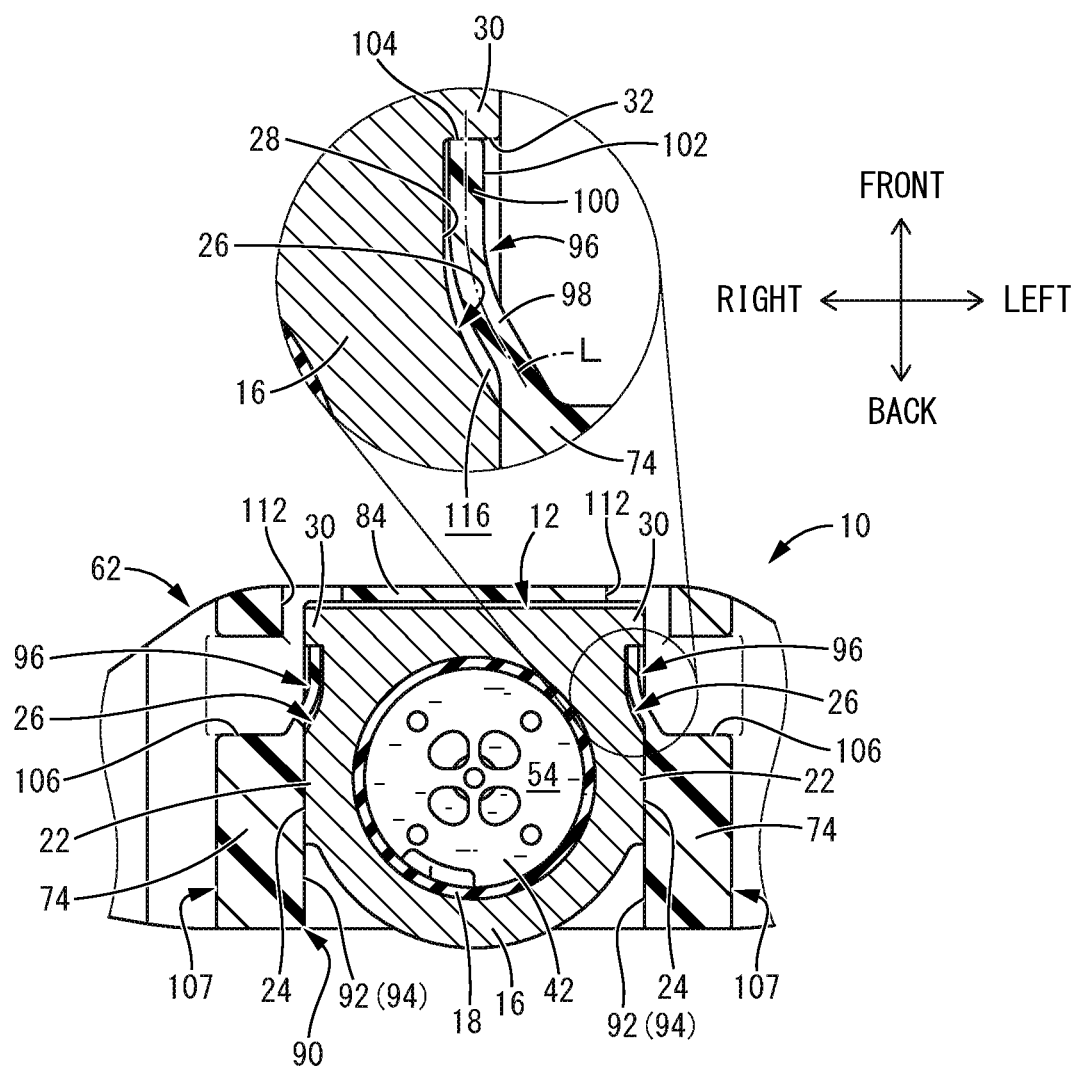
FIG. 6 is a cross-sectional view taken along line 6-6 of FIG. 4.
Figure 7:
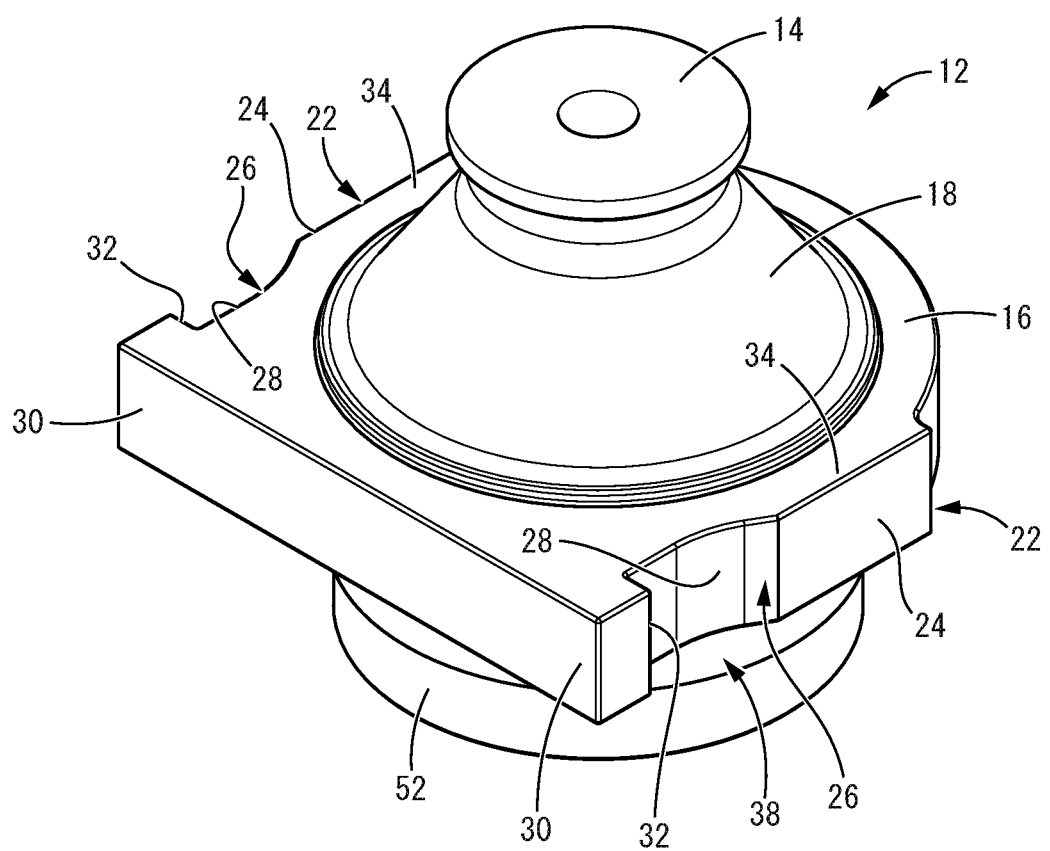
FIG. 7 is a perspective view of a mount main unit constituting the engine mount shown in FIG. 1.

The second mounting member 16 is a high rigidity component similar to the first mounting member 14, and is annular as shown in FIG. 6. As shown in FIGS. 4 and 5, the outside peripheral portion of the second mounting member 16 protrudes further downward than the inside portion so as to have a larger vertical dimension. As shown in FIGS. 4, 6, and 7, the left-right opposite ends of the second mounting member 16 serve as guide parts 22, 22. The guide parts 22, 22 are constituted by the outside peripheral portion of the second mounting member 16 whose vertical dimension is increased, and the left-right opposite surfaces serve as guide surfaces 24, 24. Each of the guide surfaces 24, 24 is a plane that extends generally orthogonally to the left-right direction. It is desirable that the guide surfaces 24, 24 extend in the front-back direction in order to obtain an advantageous guiding action when inserting the mount main unit 12 into the outer bracket 62, which will be described later, and in the present practical embodiment, the front-back dimension of the guide surface 24 is larger than its vertical dimension.

As shown in FIG. 7, outer recesses 26, 26 are formed in the guide parts 22, 22 of the second mounting member 16.

The outer recesses 26, 26 have a groove shape that opens onto the guide surfaces 24, 24 of the guide parts 22, 22 and passes through in the vertical direction. As shown in FIG. 6 as well, the outer recesses 26, 26 have respective concave bottom faces 28, 28 whose back part slopes with respect to the front-back direction. In the concave bottom faces 28, 28, in the back part, the depth dimension gradually increases toward the front, while in the front part, the depth dimension is generally constant. The concave bottom faces 28, 28 of the outer recesses 26, 26 each have a shape corresponding to that of the inner surfaces of engaging pieces 96, 96 in the left-right direction, which will be described later. The guide parts 22, 22 include respective engaging walls 30, 30 on the front side of the outer recesses 26, 26. The wall inner faces of the front (forward in the direction of insertion of the mount main unit 12) of the outer recesses 26, 26 constituted by the engaging walls 30, 30 serve as detent engaging face 32, 32, which are planes that extend generally orthogonally to the front-back direction. Further, the guide parts 22, 22 include respective mating parts 34, 34 on the back side of the outer recesses 26, 26.

As shown in FIGS. 4 and 5, the first mounting member 14 and the second mounting member 16 are disposed vertically apart on approximately the same center axis, and are elastically connected by the main rubber elastic body 18. The main rubber elastic body 18 has a generally frustoconical shape, and the first mounting member 14 is fastened to its upper part, which is the small-diameter side, and the second mounting member 16 is fastened to the outer circumferential surface of its lower part, which is the large-diameter side. The main rubber elastic body 18 is, for example, bonded by vulcanization to the first mounting member 14 and the second mounting member 16 during molding.

The main rubber elastic body 18 includes a hollow part 36 that opens downward. The hollow part 36 has a tapered shape in which the upper part of the peripheral wall becomes smaller in diameter upward. The main rubber elastic body 18 has a tapered cross-sectional shape that slopes to the outer circumference toward the bottom due to the formation of the hollow part 36.

A partition member 38 is attached to the second mounting member 16. The partition member 38 has a generally circular disk shape overall, and has a structure in which a movable member 44 is arranged between a partition member body 40 and a lid member 42.

In the outer circumferential portion of the partition member body 40, a circumferential groove 46 extending in the circumferential direction for a length less than once around the circumference is formed so as to open onto the upper surface. An annular housing recess 48 is formed in the inside portion of the partition member body 40 so as to open onto the upper surface. The upper opening of the housing recess 48 is covered by a lid member 42. The lid member 42 has a thin-walled circular disk shape, and is overlapped on and fixed to the upper surface of the partition member body 40.

The movable member 44 is housed in the housing recess 48 of the partition member body 40. The movable member 44 is a rubber elastic body having an approximately annular plate shape, with its radially inner end and its outer peripheral end both protruding upward to be thick-walled. With the movable member 44 inserted in the housing recess 48, the lid member 42 is fixed to the partition member body 40, whereby the movable member 44 is housed in housing recess 48 between the partition member body 40 and the lid member 42. The thick-walled radially inner end and outer peripheral end of the movable member 44 are clasped between the partition member body 40 and the lid member 42 in the vertical direction, and elastic deformation of the movable member 44 is allowed in the thickness direction radially between the radially inner end and the outer peripheral end. As described above, the movable member 44 of the present practical embodiment has a movable membrane structure. However, as the movable member, it would also be possible to adopt, for example, a movable plate structure that is allowed to move in the vertical direction in the housing recess 48.

A flexible film 50 formed of a thin-walled elastomer is provided below the partition member 38. The flexible film 50 has a thick-walled outer peripheral end and is overlapped with the lower surface of the partition member body 40. An annular support member 52 is overlapped with the outer peripheral end of the flexible film 50 from below, and the outer peripheral end of the flexible film 50 is clasped between the partition member body 40 and the support member 52 in the mounted state of the outer bracket 62 with respect to the mount main unit 12 to be described later.

The support member 52 is a high rigidity component similar to the second mounting member 16. In the mounted state of the outer bracket 62 with respect to the mount main unit 12, which will be described later, the outer peripheral portion of the support member 52 is in contact with the lower surface of the partition member body 40. Accordingly, the second mounting member 16, the partition member 38, and the support member 52 are mutually positioned in the vertical direction.

By the partition member 38 and the flexible film 50 being attached to the second mounting member 16, which constitutes an integrally vulcanization molded component of the main rubber elastic body 18, a pressure-receiving chamber 54 whose wall portion is partially defined by the main rubber elastic body 18 is formed between the main rubber elastic body 18 and the partition member 38. In addition, an equilibrium chamber 56 whose wall portion is partially defined by the flexible film 50 is formed between the partition member 38 and the flexible film 50. The pressure-receiving chamber 54 and the equilibrium chamber 56 are filled with a non-compressible fluid or liquid. The non-compressible fluid is not particularly limited, but for example, water, ethylene glycol, or the like can be adopted. The non-compressible fluid may be a mixture.

The pressure-receiving chamber 54 and the equilibrium chamber 56 communicate with each other through an orifice passage 58 comprising the circumferential groove 46 of the partition member 38. The orifice passage 58 extends in the outer circumferential portion of the partition member 38 in the circumferential direction, with one end communicating with the pressure-receiving chamber 54 while the other end communicating with the equilibrium chamber 56. When a vibration in the vertical direction is input across the first mounting member 14 and the second mounting member 16 so that an internal pressure difference is generated between the pressure-receiving chamber 54 and the equilibrium chamber 56, fluid flow through the orifice passage 58 is produced between the pressure-receiving chamber 54 and the equilibrium chamber 56, whereby vibration damping effects such as a high attenuating action based on the flow action of the fluid will be achieved. With the orifice passage 58, the tuning frequency, which is the resonance frequency of the flowing fluid, is adjusted to the frequency of the vibration to be damped by the ratio of passage cross sectional area to passage length, and for example, the tuning frequency is set to a low frequency on the order of 10 Hz, which corresponds to engine shake.

The liquid pressure of the pressure-receiving chamber 54 and the liquid pressure of the equilibrium chamber 56 are respectively exerted on the upper and lower surfaces of the movable member 44 arranged in the housing recess 48. When a vibration in the vertical direction is input across the first mounting member 14 and the second mounting member 16 so that an internal pressure difference is generated between the pressure-receiving chamber 54 and the equilibrium chamber 56, the movable member 44 elastically deforms in the thickness direction, so as to transmit and release the liquid pressure of the pressure-receiving chamber 54 to the equilibrium chamber 56.

When a low-frequency, large-amplitude vibration is input, fluid flow through the orifice passage 58 is actively produced in a resonant state, and the vibration damping effect due to high damping is exerted. When a low-frequency, large-amplitude vibration is input, the deformation of the movable member 44 does not fully follow the input vibration, and the effect of releasing the liquid pressure due to the deformation of the movable member 44 is reduced, so that fluid flow through the orifice passage 58 is efficiently produced. Meanwhile, when a small-amplitude vibration of medium to high frequency is input, the orifice passage 58 becomes substantially clogged due to antiresonance, but the movable member 44 actively undergoes elastic deformation in the resonant state so as to release the liquid pressure, thereby exhibiting vibration damping effect due to low dynamic spring behavior.

As shown in FIGS. 1 to 6, an inner bracket 60 and an outer bracket 62 serving as a bracket are attached to the mount main unit 12.

The inner bracket 60 is a plate-shaped member and includes a connecting part 64 that is overlapped on the upper surface of the first mounting member 14 and extends forward (to the right in FIG. 5), and an attachment part 66 integrally formed to the front of the connecting part 64. The attachment part 66 protrudes to the left-right opposite sides with respect to the connecting part 64, and is penetrated by bolt holes 70, 70 in the vertical direction. The inner bracket 60 is attached to the mount main unit 12 by being fixed by bolting to the first mounting member 14 with a connecting bolt 72. The inner bracket 60 is configured such that, in the state where the mount main unit 12 is mounted on the outer bracket 62, which will be described later, the attachment part 66 protrudes further forward than the outer bracket 62, and the connecting part 64 is inserted into an insertion hole 86 (described later) of the outer bracket 62 and fixed to the first mounting member 14.

Figure 8:
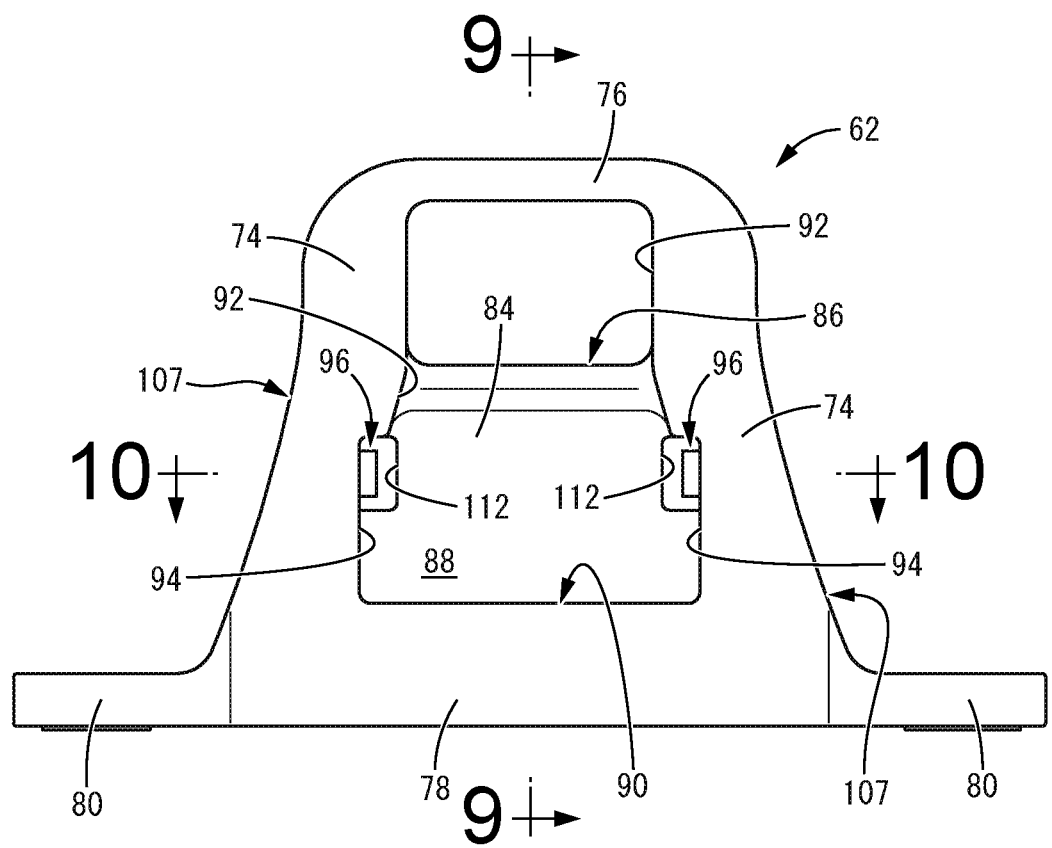
FIG. 8 is a rear view of an outer bracket constituting the engine mount shown in FIG. 1.

As shown in FIG. 8, the outer bracket 62 includes a pair of opposed walls 74, 74. The opposed walls 74, 74 each extend in the vertical direction and are opposed to each other in the left-right direction. The upper ends of the opposed walls 74, 74 are connected to each other by an integrally formed top wall 76. The lower ends of the opposed walls 74, 74 are connected to each other by an integrally formed base wall 78. The lower ends of the opposed walls 74, 74 have respective attachment pieces 80, 80 projecting outward in the left-right direction, and the attachment pieces 80, 80 are penetrated by respective bolt holes 82, 82 in the vertical direction (see FIGS. 1 and 2).

As shown in FIGS. 1 and 5, the outer bracket 62 is configured such that the front end portions of the opposed walls 74, 74 are connected to each other by an integrally formed forward wall 84. The forward wall 84 has a plate shape that extends in an intersecting direction with respect to the front-back direction, and the left-right opposite ends are connected to the opposed walls 74, 74. The forward wall 84 is remote downward from the top wall 76, and an insertion hole 86 penetrating in the front-back direction is formed between the forward wall 84 and the top wall 76.

In the outer bracket 62, the space enclosed by the opposed walls 74, 74, the top wall 76, the base wall 78, and the forward wall 84 serves as a mounting space 88 in which the mount main unit 12 is housed. The mounting space 88 has a recess shape that opens backward, and the opening to the back of the mounting space 88 serves as an insertion opening 90 (see FIGS. 2 and 6). The mounting space 88 opens forward through the insertion hole 86 at the upper part.

Figure 9:
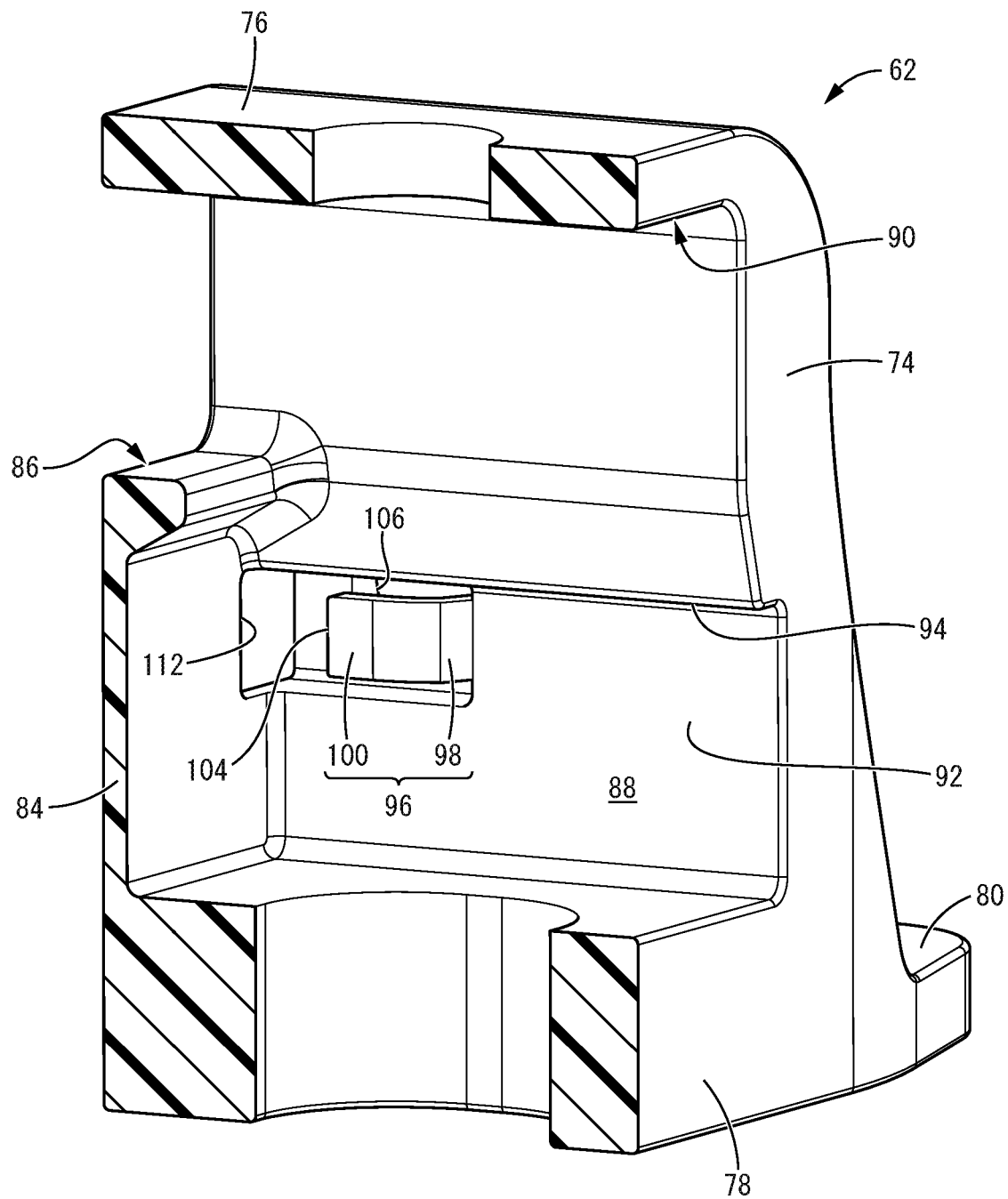
FIG. 9 is a cross-sectional perspective view of the outer bracket shown in FIG. 8, which is equivalent to a cross-sectional view taken along line 9-9 of FIG. 8.

As shown in FIGS. 8 and 9, fitting grooves 94, 94 open onto respective opposed inside faces 92, 92, which are the wall inner surfaces of the mounting space 88 defined by the pair of opposed walls 74, 74. The fitting grooves 94, 94 extend straightly in the front-back direction, and the back ends thereof reach the respective back ends of the pair of opposed walls 74, 74 and open onto the back surface of the outer bracket 62 at the insertion opening 90. In other words, the fitting grooves 94, 94 extend straightly from the insertion opening 90 toward the front, namely forward in the mounting space 88. The fitting grooves 94, 94 are provided at the respective lower parts of the opposed inside faces 92, 92, so that the distance between the opposed inside faces 92, 92 in the left-right direction is larger at the lower part than at the upper part.

Figure 10:
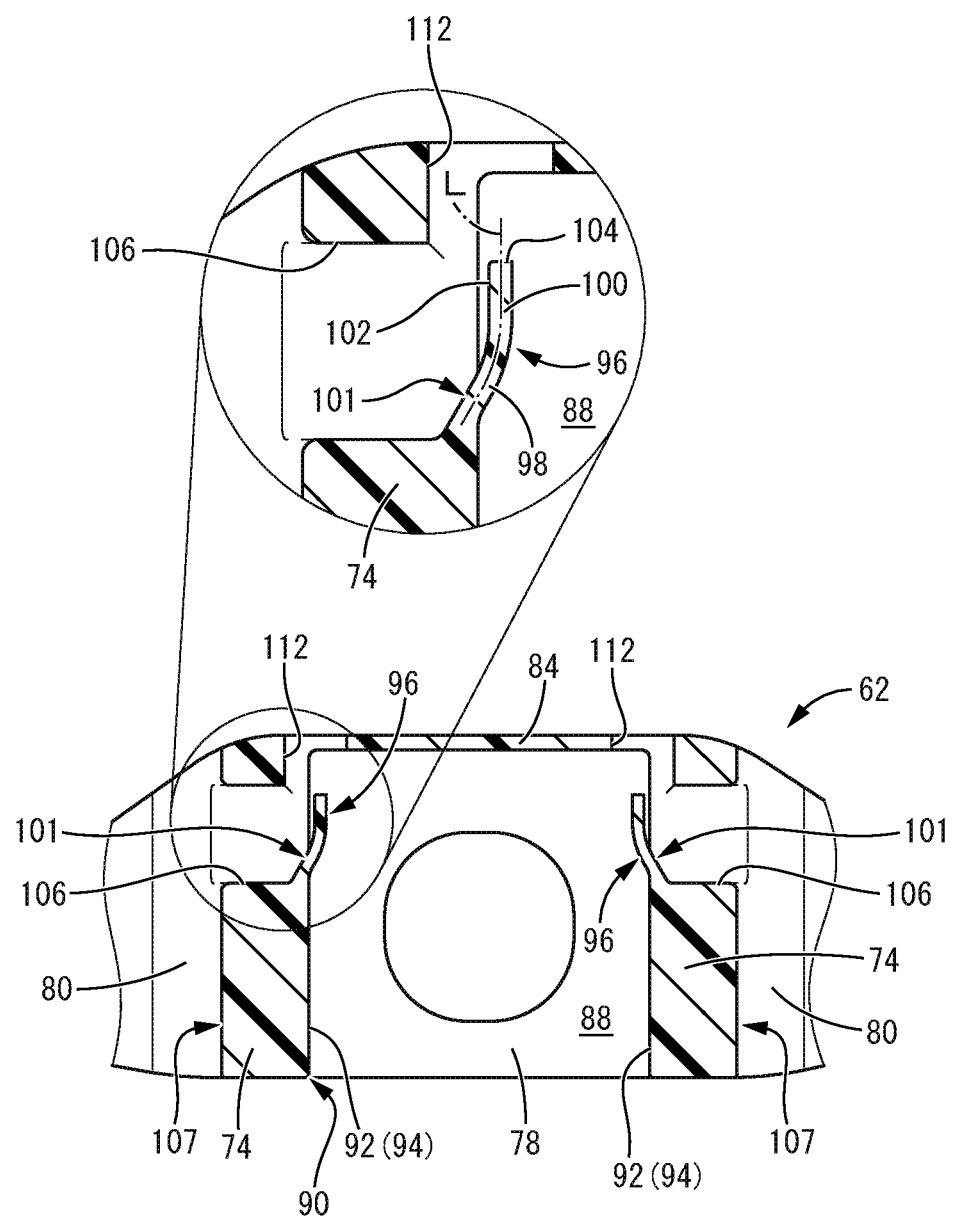
FIG. 10 is a cross-sectional view taken along line 10-10 of FIG. 8.

The opposed walls 74, 74 of the outer bracket 62 are integrally provided with engaging pieces 96, 96 extending from the respective opposed inside faces 92, 92. The engaging pieces 96, 96 each have a plate shape and have flexibility and elasticity in the plate thickness direction. The inner surfaces of the engaging pieces 96, 96 in the left-right direction have shapes corresponding to the concave bottom faces 28, 28 of the outer recesses 26, 26. As shown in FIG. 10, proximal end portions 98, 98 of the engaging pieces 96, 96 comprise slope portions extending so as to slope inward in the left-right direction toward the front.

Distal end portions 100, 100 of the engaging pieces 96, 96 extend forward in the generally front-back direction. Outside surfaces 101, 101 of the engaging pieces 96, 96 in the left-right direction comprise first inspection flat surfaces 102, 102 that spread orthogonally to the left-right direction at the distal end portions 100, 100. Further, distal end faces 104, 104 of the engaging pieces 96, 96 are flat surfaces that spread generally orthogonally to the front-back direction.

Figure 11:
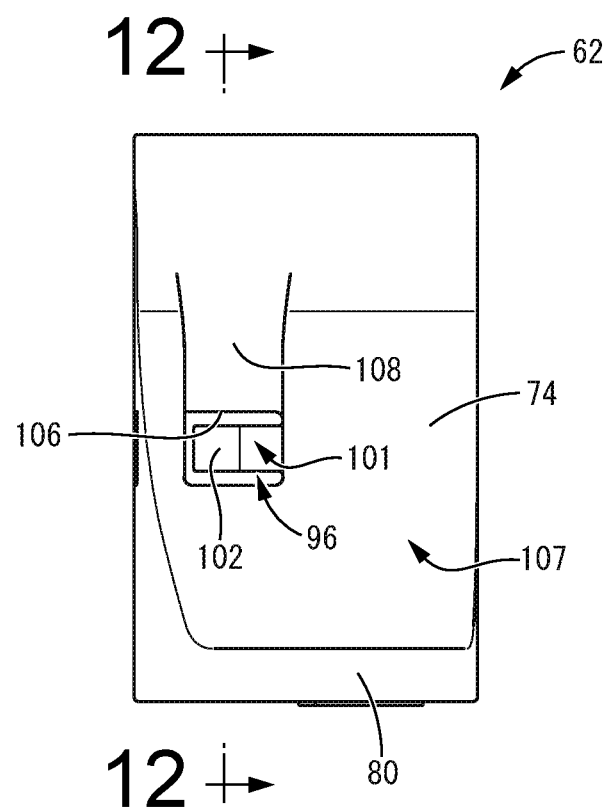
FIG. 11 is a right side view of the outer bracket shown in FIG. 8.
Figure 12:
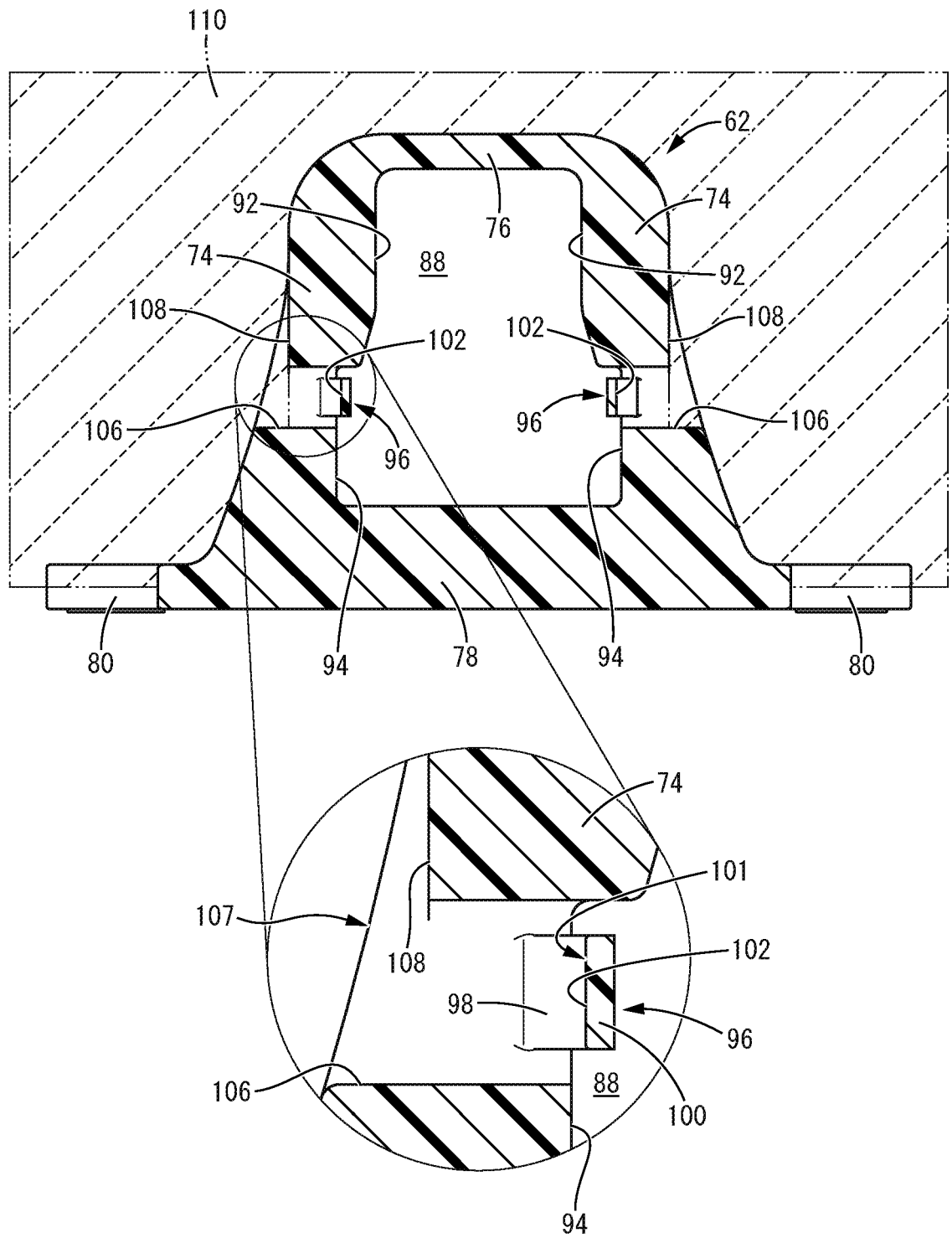
FIG. 12 is a cross-sectional view taken along line 12-12 of FIG. 11.

The pair of opposed walls 74, 74 of the outer bracket 62 are penetrated by respective aperture windows 106. As shown in FIGS. 10 to 12, the aperture windows 106, 106 are holes having an approximately quadrangular cross section and penetrating in the left-right direction. One end of each of the aperture windows 106, 106 opens to corresponding one of external side surfaces 107, 107 of the opposed walls 74, 74 of the outer bracket 62 to communicate with the outside, and the other end thereof opens to corresponding one of inner side surfaces of the opposed wall 74, 74 and communicates with the corresponding one of the fitting grooves 94, 94 forming the mounting space 88. The aperture windows 106, 106 are located on the outer sides of the respective engaging pieces 96, 96 in the left-right direction, and as shown in FIG. 11, the first inspection flat surfaces 102, 102 of the engaging pieces 96, 96 are exposed to the outside in the left-right direction through the aperture windows 106, 106. With this configuration, the first inspection flat surfaces 102, 102 of the engaging pieces 96, 96 are visible from the outside through the aperture windows 106, 106 in the left-right direction. The aperture windows 106, 106 of the present practical embodiment have a size, position, and shape that expose not only the first inspection flat surfaces 102, 102 but also the entire outside surfaces 101, 101 of the engaging pieces 96, 96. However, for example, it would also be acceptable that only a part of the outside surfaces 101, 101 of the engaging pieces 96, 96 including at least a part of the first inspection flat surfaces 102, 102 is exposed to the outside in the left-right direction through the aperture windows 106, 106.

In the present practical embodiment, each engaging piece 96 is formed so as to project forward from the inside end (the opposed inside face 92—side end) of the back end side inner surface of the corresponding aperture window 106 having an approximately quadrangular shape. The engaging piece 96 is located on the inside opening of the aperture window 106, and at least the inside surface of the distal end portion 100 is positioned so as to project into the mounting space 88 beyond the inside opening surface of the aperture window 106.

With this configuration, the first inspection flat surfaces 102, 102 of the engaging pieces 96, 96 are visible from the outside through the aperture windows 106, 106 in the left-right direction. The aperture windows 106, 106 of the present practical embodiment have a size, position, and shape that expose not only the first inspection flat surfaces 102, 102 but also the entire outside surfaces 101, 101 of the engaging pieces 96, 96. However, for example, it would also be acceptable that only a part of the outside surfaces 101, 101 of the engaging pieces 96, 96 including at least a part of the first inspection flat surfaces 102, 102 is exposed to the outside in the left-right direction through the aperture windows 106, 106. Preferably, the aperture window 106 is formed with a position and shape in which the distal end portion 100 including the distal end edge of each engaging piece 96 is exposed to the outside through the corresponding aperture window 106 in at least a part in the vertical direction and in the front-back direction.

Second inspection flat surfaces 108, 108 are provided to the upper side of the respective aperture windows 106, 106. The second inspection flat surfaces 108, 108 are provided to the respective external side surfaces 107, 107 of the opposed walls 74, 74, and spread generally orthogonally to the left-right direction. The second inspection flat surfaces 108, 108 are provided so as to be upwardly adjacent to the aperture windows 106, 106, and spread so as to extend upward from the upper edge of the aperture windows 106, 106. In the present practical embodiment, the width dimension of the second inspection flat surfaces 108, 108 in the front-back direction is generally the same as the width dimension of the aperture windows 106, 106 in the front-back direction. Since the aperture windows 106, 106 open to the portions where the external side surfaces 107, 107 of the opposed walls 74, 74 slope downward, the second inspection flat surfaces 108, 108 are provided in a groove shape on the external side surfaces 107, 107 of the opposed walls 74, 74.

The mold for molding the outer surface of the outer bracket 62 is vertically parted, and a mold 110 for molding the external side surfaces 107, 107 of the opposed walls 74, 74 shown by a hatch pattern with a dashed line in FIG. 12 is demolded upward. Therefore, it is possible to easily form the second inspection flat surfaces 108, 108 like the groove bottom faces extending vertically on the external side surfaces 107, 107 of the opposed walls 74, 74 at the positions that are upwardly adjacent to the respective aperture windows 106, 106.

As shown in FIG. 12, the first inspection flat surfaces 102, 102 and the respective second inspection flat surfaces 108, 108 both spread orthogonally to the left-right direction and are parallel to each other. However, the description that the first inspection flat surfaces 102, 102 and the second inspection flat surfaces 108, 108 are parallel to each other does not necessarily mean that they are mathematically strictly parallel. Specifically, for example, it is permissible that a slight slope (an extraction taper) for facilitating the demolding of the mold 110 is set to the second inspection flat surfaces 108, 108 or the like, so that the first inspection flat surfaces 102, 102 and the second inspection flat surfaces 108, 108 are slightly inclined with respect to each other. For example, when the relative slope angle between the first inspection flat surfaces 102, 102 and the second inspection flat surfaces 108, 108 is 1 degree or less, the first inspection flat surfaces 102, 102 and the second inspection flat surfaces 108, 108 can be regarded as parallel to each other.

As shown in FIG. 1, a pair of holes 112, 112 are formed in the forward wall 84. The holes 112, 112 penetrate the forward wall 84 in the front-back direction, and are arranged on the extension of the respective fitting grooves 94, 94 as shown in FIGS. 8 and 10. The vertically opposite wall inner surfaces of each of the holes 112, 112 are arranged at the same position in the vertical direction with respect to the vertically opposite wall inner surfaces of the corresponding one of the aperture windows 106, 106. The wall inner surface of each hole 112, 112 on the outside in the left-right direction is located on the outer side than the outer surface of the corresponding one of the engaging pieces 96, 96 in the left-right direction, while the wall inner surface of each hole 112, 112 on the inside in the left-right direction is located on the inner side than the inner surface of the corresponding one of the engaging pieces 96, 96 in the left-right direction. Therefore, at the time of molding the outer bracket 62, the front surface including the distal end faces 104, 104 of the engaging pieces 96, 96 can be molded by a mold (not shown) forming the holes 112, 112.

Figure 13:
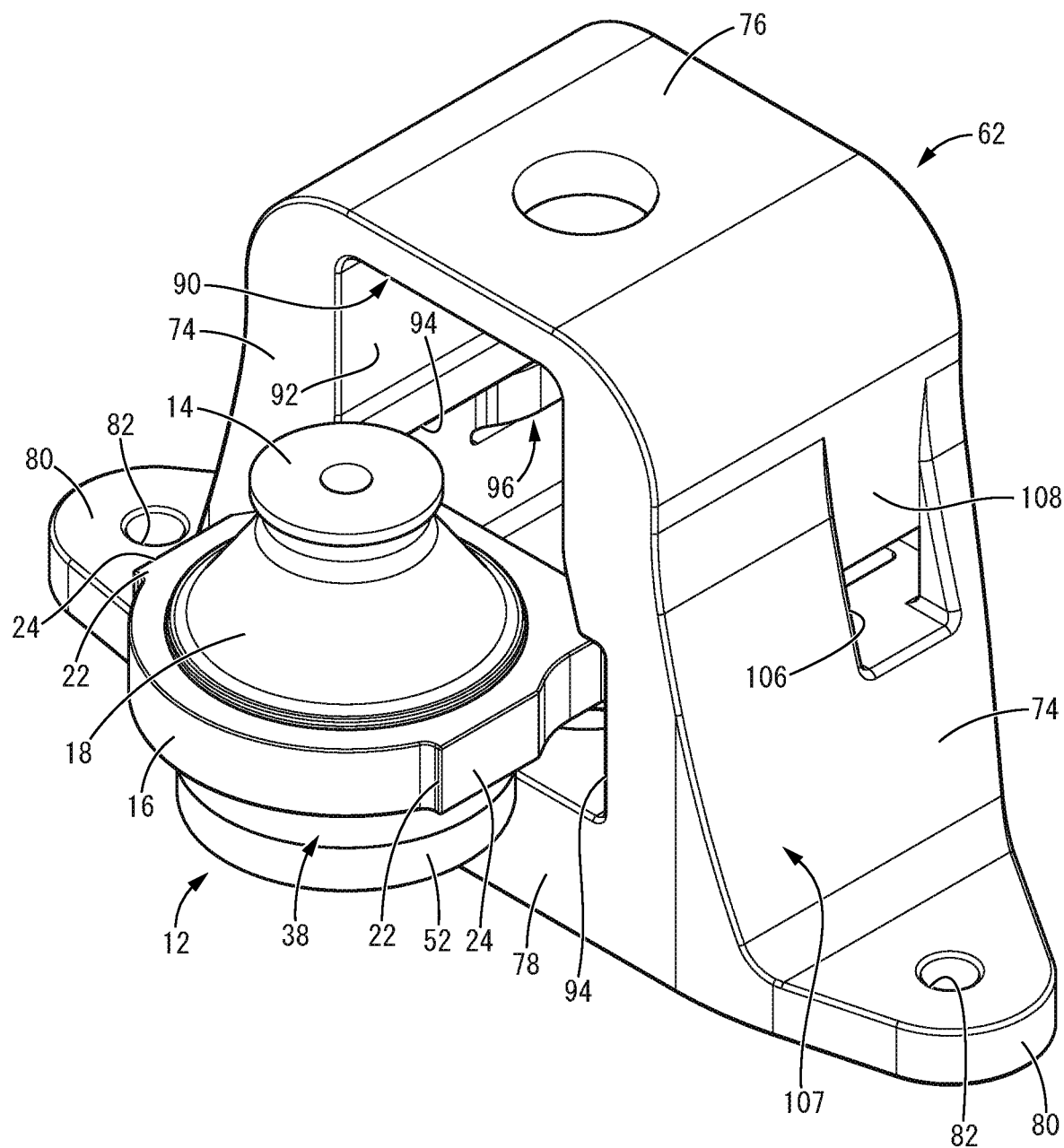
FIG. 13 is a perspective view suitable for explaining insertion of the mount main unit shown in FIG. 7 into the outer bracket shown in FIG. 8.

The outer bracket 62 is attached to the mount main unit 12 as shown in FIGS. 1 to 6. That is, as shown in FIG. 13, the mount main unit 12 is inserted forward, namely in the direction of attachment, into the mounting space 88 of the outer bracket 62 from the insertion opening 90. At that time, as shown in FIG. 4, the fitting parts 114, 114 forming the left-right opposite ends of the mount main unit 12 are inserted forward into the respective fitting grooves 94, 94 provided to the pair of opposed walls 74, 74 of the outer bracket 62 from the insertion opening 90 side, so that the fitting parts 114, 114 including the second mounting member 16 are clasped between the upper and lower side wall portions of each of the fitting grooves 94, 94. By so doing, the second mounting member 16 arranged between the opposed inside faces 92, 92 is securely supported by the outer bracket 62, and the mount main unit 12 is attached to the outer bracket 62 from the lateral side (the back side) which is generally orthogonal to the vertical direction. The fitting parts 114, 114 of the present practical embodiment are constituted by the second mounting member 16, the partition member 38, and the support member 52. Further, the support member 52 is overlapped with the upper surface of the base wall 78 of the outer bracket 62 not only at the left-right opposite end portions but over the entire circumference including the front-back opposite end portions.

By the fitting parts 114, 114 of the mount main unit 12 being fitted into the fitting grooves 94, 94, a force in the direction of approach in the vertical direction is exerted between the second mounting member 16 and the support member 52. With this arrangement, the lower end of the main rubber elastic body 18 is compressed in the vertical direction between the second mounting member 16 and the partition member 38, and the outer peripheral end of the flexible film 50 is compressed in the vertical direction between the partition member 38 and the support member 52. As a result, the fluidtightness at the walls of the pressure-receiving chamber 54 and the equilibrium chamber 56 is enhanced, and troubles such as liquid leakage are avoided.

By the fitting parts 114, 114 of the mount main unit 12 being fitted into the fitting grooves 94, 94, the guide surfaces 24, 24 of the second mounting member 16 are overlapped with the respective groove bottom faces of the fitting grooves 94, 94. With this configuration, the second mounting member 16 and the outer bracket 62 are mutually positioned in the left-right direction.

As shown in FIG. 7, the engaging pieces 96, 96 projecting from the opposed inside faces 92, 92 of the outer bracket 62 is inserted into the outer recesses 26, 26 of the second mounting member 16 by the mount main unit 12 being attached to the outer bracket 62. The insertion process of the engaging pieces 96, 96 into the outer recesses 26, 26 and the engaging structure (the detent structure) formed thereby, which will be described below, is similar generally symmetrically on both the left and right sides. Thus, the description will be given about one side.

Specifically, since the proximal end portion 98 of the engaging piece 96 comprises the slope portion, the engaging piece 96 is located on the inner side in the left-right direction than the bottom face of the fitting groove 94. Therefore, by the mount main unit 12 being inserted into the mounting space 88 of the outer bracket 62 from the back to the front, the engaging wall 30 of the second mounting member 16 comes into contact with proximal end portion 98 of the engaging piece 96.

By the mount main unit 12 moving further forward with respect to the outer bracket 62, the engaging wall 30 climbs over the engaging piece 96 while elastically deforming the engaging piece 96 and pushing it outward in the left-right direction. In the present practical embodiment, since the engaging piece 96 is located on the extension of the aperture window 106, when the engaging wall 30 climbs over the engaging piece 96, deformation and displacement of the engaging piece 96 outwardly in the left-right direction is sufficiently allowed.

When the engaging wall 30 moves further forward than the engaging piece 96, the outward force in the left-right direction that has been exerted on the engaging piece 96 by the contact of the engaging wall 30 is canceled, so that the engaging piece 96 elastically recovers its original shape, and the engaging piece 96 is inserted into the outer recess 26. Since the proximal end portion 98 of the engaging piece 96 extends so as to slope inward in the left-right direction, the engaging piece 96 is inserted into the outer recess 26 simply by moving the mount main unit 12 forward with respect to the outer bracket 62.

The distal end face 104 of the engaging piece 96 inserted into the outer recess 26 is overlapped with the detent engaging face 32 of the outer recess 26. The center in the left-right direction of the distal end face 104 located on the center axis L of the engaging piece 96 is located in the outer recess 26, and the center in the left-right direction of the distal end face 104 is overlapped with the detent engaging face 32 of the outer recess 26. In the present practical embodiment, the entire distal end face 104 is housed in the outer recess 26 and overlapped with the detent engaging face 32.

It is desirable that the distal end face 104 of the engaging piece 96 be in contact with the detent engaging face 32 in order that the resistance to dislodgement described later can be quickly exerted, but distal end face 104 may be overlapped so as to be opposed to the detent engaging face 32 with a gap, so that engagement failure due to catching between the distal end face 104 of the engaging piece 96 and the detent engaging face 32 is less likely to occur. Further, the inner surface of the engaging piece 96 in the left-right direction may be in contact with the concave bottom face 28 of the outer recess 26, but it is desirable that a gap 116 be provided between the overlapped surfaces of the inner surface of the engaging piece 96 in the left-right direction and the concave bottom face 28.

When the mount main unit 12 is about to become dislodged from the outer bracket 62 through the insertion opening 90 backward opposite to the direction of attachment, the movement of the mount main unit 12 backward (in the direction of dislodgment) with respect to the outer bracket 62 is limited by the latch between the engaging piece 96 and the detent engaging face 32 of the outer recess 26.

When the mount main unit 12 is about to move backward relative to the outer bracket 62, and the distal end face 104 of the engaging piece 96 is engaged with the detent engaging face 32 of the outer recess 26, a contact reaction force is exerted on the engaging piece 96. Regarding the engaging piece 96, due to the action of the contact reaction force, the slope angle of the proximal end portion 98, which is the slope portion, changes, and the distal end portion 100 moves inward in the left-right direction, so that the distal end portion 100 of the engaging piece 96, which has moved inward in the left-right direction, comes into contact with the concave bottom face 28 of the outer recess 26. By so doing, the movement of the distal end portion 100 of the engaging piece 96 inward in the left-right direction is limited by the concave bottom face 28, which is a stopper face, and the further change of the slope angle of the proximal end portion 98 is limited. Due to the tilting motion of the proximal end portion 98 being limited, the contact reaction force input to the engaging piece 96 acts primarily as a compression force in the direction of extension of the center axis L. Then, the excellent load bearing performance of the engaging piece 96 against the compression in the direction of extension of the center axis L limits the backward movement of the second mounting member 16 relative to the outer bracket 62, thereby preventing the mount main unit 12 from becoming dislodged backward from the outer bracket 62. In this way, in the engine mount 10, the excellent load bearing capability of the engaging piece 96 against the compression in the center axis direction can be skillfully utilized to obtain a larger resistance to dislodgement that prevents the mount main unit 12 from becoming dislodged backward from the outer bracket 62.

Since the distal end face 104 of the engaging piece 96 and the detent engaging face 32 of the outer recess 26 both spread orthogonally to the front-back direction, when the distal end face 104 and the detent engaging face 32 are latched, forces in the left-right and vertical directions are less likely to act between the distal end face 104 and the detent engaging face 32. Therefore, the force in the orthogonal direction is efficiently applied to the distal end face 104 of the engaging piece 96, thereby efficiently obtaining the resistance to dislodgement in the front-back direction.

The distal end portion 100 of the engaging piece 96 extends in the front-back direction, and the distal end face 104 of the engaging piece 96 and the detent engaging face 32 of the outer recess 26 both spread generally orthogonally to the front-back direction. With this configuration, the direction of the force exerted on the engaging piece 96 by contact and latch of the distal end face 104 with the detent engaging face 32 approximately coincides with the direction of extension of the center axis L at the distal end portion 100 of the engaging piece 96. Therefore, the force due to the latch between the engaging piece 96 and the detent engaging face 32 is more efficiently exerted on the engaging piece 96 as a compression force in the direction of extension of the center axis L.

At the distal end face 104 of the engaging piece 96, the center axis L is located within the outer recess 26. With this configuration, the moment caused by the contact reaction force acting on the engaging piece 96 is reduced, and the contact reaction force is more efficiently exerted on the engaging piece 96 as a compression force, so that the resistance to dislodgement is efficiently exhibited. In the present practical embodiment, the opposite ends in the left-right direction of the distal end face 104 of the engaging piece 96 are both located within the outer recess 26, so that the entire distal end face 104 is housed in the outer recess 26. With this arrangement, the distal end face 104 of the engaging piece 96 is in contact with and latched by the detent engaging face 32 of the outer recess 26 over a wide area, thereby efficiently obtaining the resistance to dislodgement.

The stopper face, which limits the deformation of the engaging piece 96 by coming into contact with the engaging piece 96, is constituted by the concave bottom face 28 of the outer recess 26. Since the concave bottom face 28 of the outer recess 26 has a shape that corresponds to the inner surface of the engaging piece 96 in the left-right direction, the engaging piece 96 inserted into the outer recess 26 comes into contact with the concave bottom face 28 over a wide area. Therefore, the resistance to dislodgement due to stress against the compressive load of the engaging piece 96 is efficiently manifested, thereby avoiding damage to the engaging piece 96 caused by its excessive deformation.

In the engaging piece 96, the distal end portion 100 extending so as not to slope with respect to the front-back direction and the proximal end portion 98 extending so as to slope with respect to the front-back direction are smoothly continuous with each other, and no corners or unevenness are formed on the outer surface at their boundary part. Therefore, when a force is transmitted from the distal end portion 100 to the proximal end portion 98 in the direction of the extension of the center axis L, local stress concentration is avoided, thereby avoiding damage to the engaging piece 96 or the like.

The engaging piece 96 is provided in the middle of the outer bracket 62 in the front-back direction. Thus, in the isolated state of the outer bracket 62 to which the mount main unit 12 is not attached, damage to the engaging piece 96 is prevented. In particular, since the forward wall 84 is provided at the front end portion of the outer bracket 62, the front of the engaging piece 96 is covered and protected by the forward wall 84, thereby more effectively preventing damage to the engaging piece 96.

Meanwhile, in the engine mount 10 in which the outer bracket 62 is attached to the mount main unit 12, it is necessary to confirm whether or not there is a problem in the engagement between the distal end face 104 of the engaging piece 96 and the detent engaging face 32 due to the engaging piece 96 being damaged when the engaging wall 30 climbs over the engaging piece 96 or the like. Therefore, by a method of manufacturing the engine mount 10 including a step (a non-destructive inspection step) of measuring relative positions of the first inspection flat surface 102 and the second inspection flat surface 108 on each of both the left and right sides with the outer bracket 62 attached to the mount main unit 12, it is possible to detect engagement failure between the engaging pieces 96, 96 and the respective detent engaging faces 32, 32.

That is, when the engaging wall 30 of the mount main unit 12 climbs over the engaging piece 96 of the outer bracket 62, the engaging piece 96 elastically deforms, so that the first inspection flat surface 102 moves relative to the second inspection flat surface 108. Then, when the engaging wall 30 climbed over the engaging piece 96 and the engaging piece 96 is inserted into the outer recess 26, the engaging piece 96 recovers its initial shape. Accordingly, the first inspection flat surface 102 returns to the initial relative position with respect to the second inspection flat surface 108. Therefore, in the engine mount 10 in which the outer bracket 62 is mounted on the mount main unit 12, if the relative positions of the first inspection flat surface 102 and the second inspection flat surface 108 in the left-right direction coincide with their initial positions, it means that the engaging piece 96 including the first inspection flat surface 102 is arranged in an appropriate position without damage, and the engaging piece 96 and the detent engaging face 32 are properly engaged.

On the other hand, in the engine mount 10 in which the outer bracket 62 is mounted on the mount main unit 12, if the relative positions of the first inspection flat surface 102 and the second inspection flat surface 108 in the left-right direction deviate from their initial relative positions, it is considered that the engaging piece 96 and the detent engaging face 32 are not properly engaged. That is, in the cases where the engaging piece 96 and the detent engaging face 32 are not properly engaged, such as when the engaging piece 96 are caught on the detent engaging face 32 or the like and the engaging piece 96 is not properly housed in the outer recess 26, and when the engaging piece 96 gets damaged while climbing over the engaging wall 30, the engaging piece 96 does not recover its initial shape. Therefore, when the engagement between the engaging piece 96 and the detent engaging face 32 is failed, relative positions of the first inspection flat surface 102 provided to the engaging piece 96 and the second inspection flat surface 108 in the left-right direction deviate from their initial positions. Therefore, after mounting the outer bracket 62 on the mount main unit 12, by performing the non-destructive inspection step of measuring the relative positions of the first inspection flat surface 102 and the second inspection flat surface 108 in the left-right direction, it is possible to detect the engagement failure between the engaging piece 96 and the detent engaging face 32 due to, for example, damage to the engaging piece 96, based on the measurement results.

In the present practical embodiment, the gap 116 is set between the inner surface of the engaging piece 96 in the left-right direction and the concave bottom face 28 of the outer recess 26. Thus, if the engaging piece 96 is properly housed in the outer recess 26, the engaging piece 96 will not be pushed outward in the left-right direction by the concave bottom face 28. Therefore, in an appropriate engaged state between the engaging piece 96 and the detent engaging face 32, the relative positions of the first inspection flat surface 102 of the engaging piece 96 and the second inspection flat surface 108 will not deviate from their initial relative positions, and the engaged state can be accurately grasped based on the relative positions of the first inspection flat surface 102 and the second inspection flat surface 108.

Figure 3:
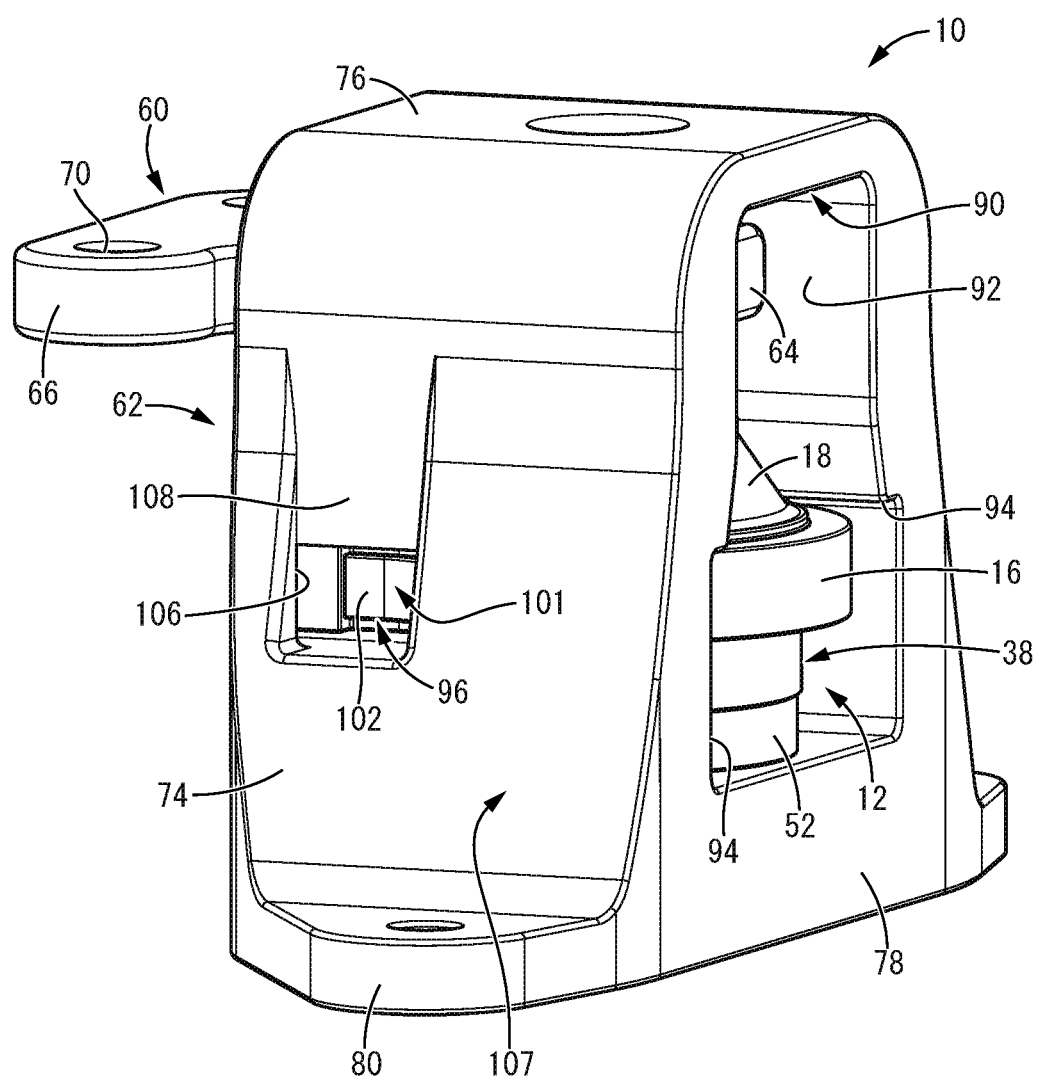
FIG. 3 is a perspective view of the engine mount shown in FIG. 1 at yet another angle.

As shown in FIGS. 3, 11, and 12, the first inspection flat surface 102 provided to the engaging piece 96 is exposed to the outside in the left-right direction through the aperture window 106, while the second inspection flat surface 108 is provided on the external side surface 107 of each opposed wall 74 exposed to the outside in the left-right direction. With this configuration, the relative positions of the first inspection flat surface 102 and the second inspection flat surface 108 can be easily measured from the outside.

The method for measuring the relative positions of the first inspection flat surface 102 and the second inspection flat surface 108 is not particularly limited. For example, the relative positions of the first inspection flat surface 102 and the second inspection flat surface 108 can be measured by a known method using reflection of radio waves, light waves, or the like. It is preferable to adopt a method of irradiating the first inspection flat surface 102 and the second inspection flat surface 108 exposed to the outside in the left-right direction with a laser, and measuring the relative positions of the first inspection flat surface 102 and the second inspection flat surface 108 based on the reflected light. Such a non-destructive inspection step enables more accurate and quicker inspection than visual confirmation, and also enables automatic inspection by a machine.

For example, with respect to the engine mount 10 sent forward or backward by a belt conveyor or the like, by irradiating the first inspection flat surfaces 102, 102 and the second inspection flat surfaces 108, 108 on the left and right sides with a laser from both sides in the left-right direction, the relative distance between the first inspection flat surface 102 and the second inspection flat surface 108 can be measured and inspected on each of both the left and right sides. This facilitates automation of the inspection, and the number of personnel required for the inspection can be reduced.

The first inspection flat surface 102 and the second inspection flat surface 108 are parallel to each other. Thus, even if there is a deviation in the feed position of the engine mount 10 forward or backward by the belt conveyor or the like, the reflection direction of the laser or the like is less likely to change, thereby making it possible to measure the relative positions of the first inspection flat surface 102 and the second inspection flat surface 108 with stability and high accuracy. In preferred practice, with respect to the first inspection flat surface 102 and the second inspection flat surface 108, the size in the front-back direction and the size in the vertical direction are set such that measurement of the relative positions by a laser or the like is possible even if there is a deviation in the feed position of the engine mount 10 or the like described above.

In the non-destructive inspection step, it is desirable that the relative positions of the first inspection flat surface 102 and the second inspection flat surface 108 be measured in the left-right direction orthogonal to the first inspection flat surface 102 and the second inspection flat surface 108. This enables stable measurement during mass production in which a large number of engine mounts 10 are inspected. This is because, for example, when the relative positions of the first inspection flat surface 102 and the second inspection flat surface 108 are measured by using the reflected lights of the laser irradiated in the measurement direction or the like, even if the distances from the light receiving positions of the reflected lights to the inspection flat surfaces 102, 108 vary, the reflected lights reflected by the inspection flat surfaces 102, 108 are less likely to deviate from the light receiving positions.

A practical embodiment of the present invention has been described in detail above, but the present invention is not limited to those specific descriptions. For example, the specific shape of the engaging piece can be changed as appropriate. Specifically, for example, in the preceding practical embodiment, the engaging piece 96 extending in a generally constant cross-sectional shape is illustrated. However, the cross-sectional shape of the engaging piece may be changed in the length direction. Namely, the engaging piece may be thickened from the distal end toward the proximal end, or may be widened from the distal end toward the proximal end in the vertical direction, or the like.

For example, it would also be acceptable that, on the opposed inside faces 92, 92 of the outer bracket 62, respective fitting grooves are formed so as to open inward in the left-right direction and extend in the front-back direction. By the left and right opposite end portions of the second mounting member 16 (the guide parts 22, 22) being fitted in the said fitting grooves, the outer bracket 62 may be fixed only to the second mounting member 16. Additionally, by interposing a rubber elastic body between the overlapped surfaces of the attachment portion of the mount main unit 12 and the outer bracket 62, it is also possible to allow dimensional error or the like.

The outside surface 101 in the left-right direction of the engaging piece 96 does not necessarily have to be entirely exposed from the aperture window 106, and it is acceptable as long as the first inspection flat surface 102 is exposed through the aperture window 106.

The arrangement of the second inspection flat surface 108 is not limited as long as it is provided at a position off the aperture window 106 on the external side surface 107 of each opposed wall 74. For example, the second inspection flat surface 108 may be arranged adjacently to the aperture window 106 on the outside in the front-back direction, or may be provided at a position away from the aperture window 106.

It would also be acceptable that, when a predetermined deviation from the initial relative positions of the first inspection flat surface 102 and the second inspection flat surface 108 is measured, the engaged state between the engaging piece 96 and the detent engaging face 32 is determined to be appropriate, and when the deviation from the initial relative positions of the first inspection flat surface 102 and the second inspection flat surface 108 is larger or smaller than the predetermined amount, the engaged state between the engaging piece 96 and the detent engaging face 32 is determined to be inappropriate. Such a determination method can be adopted in the case where, for example, the gap 116 is not set between the engaging piece 96 and the concave bottom face 28 of the outer recess 26, and the engaging piece 96 is overlapped with the concave bottom face 28 in a contact state.

While the preceding practical embodiment illustrates the vibration-damping device main unit of a fluid-filled type, the vibration-damping device main unit may be, for example, a solid type that is not a fluid-filled type.

What is claimed is:

1. A vibration damping device comprising:
   a vibration-damping device main unit including a fixture member; and
   a bracket having a pair of opposed walls and a mounting space defined by opposed inside faces of the opposed walls, the vibration-damping device main unit being inserted into the mounting space of the bracket from a lateral side such that the fixture member of the vibration-damping device main unit is arranged between the opposed inside faces of the mounting space and securely supported by the bracket, wherein
   the bracket includes a pair of engaging pieces on the respective opposed inside faces of the mounting space such that each engaging piece has a proximal end portion extending so as to slope inward in an opposite direction of the opposed wall, and has a distal end portion extending toward front in an insertion direction of the vibration-damping device main unit into the bracket, the vibration-damping device main unit includes a pair of outer recesses open in an outer surface of the fixture member that are adapted to be fixed to the opposed inside faces, a pair of engaging walls are provided on a front side of the outer recesses in the insertion direction, and detent engaging faces are formed by wall inner faces of a front of the outer recesses constituted by the engaging walls, the engaging pieces are configured to come into contact with the engaging walls when the vibration-damping device main unit is inserted into the bracket, are configured to be elastically deformed outwardly in the opposite direction so as to allow insertion of the vibration-damping device main unit into the bracket, and are configured to be elastically recovered inwardly in the opposite direction so as to be housed within the outer recesses so that engaging action of the engaging pieces with respect to the respective detent engaging faces prevents the vibration-damping device main unit from becoming dislodged from the mounting space of the bracket, and the opposed walls of the mounting space of the bracket are each penetrated by an aperture window open both in the inside faces and outside faces, and inspection flat surfaces are separately provided to an outside surface of the distal end portion of each engaging piece visible from an outside through the aperture window and a corresponding external side surface of the bracket that is off the aperture window, the inspection flat surfaces being parallel to each other in the insertion direction.

2. The vibration damping device according to claim 1, wherein a gap is provided between overlapped surfaces of an inside surface of each engaging piece and the fixture member.

3. The vibration damping device according to claim 1, wherein the inspection flat surface provided to the external side surface of the bracket is provided adjacently to the aperture window in a direction orthogonal to an opening direction of the aperture window.

4. A method of manufacturing the vibration damping device according to claim 1, comprising
a non-destructive inspection step of measuring relative positions of the inspection flat surface provided to the outside surface of each engaging piece and the inspection flat surface provided to the corresponding external side surface of the bracket such that engagement failure between the engaging piece and the corresponding detent engaging face is detected.

5. The method according to claim 4, wherein the relative positions of the inspection flat surfaces are measured in a direction orthogonal to the inspection flat surfaces.

* * * * *